United States Patent
Fread et al.

(10) Patent No.: US 11,873,998 B2
(45) Date of Patent: Jan. 16, 2024

(54) CENTRAL PLANT WITH SECONDARY STRONG PREVENTION

(71) Applicant: Johnson Controls Tyco IP Holdings LLP, Milwaukee, WI (US)

(72) Inventors: Jared Fread, Milwaukee, WI (US); Ryan C. Beaty, Milwaukee, WI (US); Shawn A. Schlagenhaft, Fon du Lac, WI (US); Graeme Willmott, West Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 1212 days.

(21) Appl. No.: 16/260,030

(22) Filed: Jan. 28, 2019

(65) Prior Publication Data

US 2020/0241577 A1 Jul. 30, 2020

(51) Int. Cl.
*F24D 19/10* (2006.01)
*G05D 7/06* (2006.01)
(Continued)

(52) U.S. Cl.
CPC ..... *F24D 19/1048* (2013.01); *F24D 19/1006* (2013.01); *F24H 1/225* (2013.01);
(Continued)

(58) Field of Classification Search
None
See application file for complete search history.

(56) References Cited

U.S. PATENT DOCUMENTS

| 4,487,028 A | * | 12/1984 | Foye | F25D 17/02 |
| | | | | 165/218 |
| 9,447,985 B2 | | 9/2016 | Johnson | |

(Continued)

FOREIGN PATENT DOCUMENTS

| CA | 2957726 A1 | 3/2016 |
| CA | 3043996 A1 | 2/2018 |

(Continued)

OTHER PUBLICATIONS

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Avinash A Savani
*Assistant Examiner* — Deepak A Deean
(74) *Attorney, Agent, or Firm* — Foley & Lardner LLP

(57) ABSTRACT

A central plant includes a plurality of subplants including a chiller configured to output supply water at a supply water temperature, a sensor configured obtain a measurement of the supply water temperature, and a control system. The control system is configured to calculate an additional load factor based on the measurement of the supply water temperature and a supply water temperature setpoint, obtain an actual load for the chiller, calculate an effective load based on the additional load factor and the actual load, generate load allocations for the plurality of subplants based on the effective load, and control the plurality of subplants to operate in accordance with the load allocations.

20 Claims, 4 Drawing Sheets

(51) Int. Cl.
  *G05D 23/19* (2006.01)
  *F25B 29/00* (2006.01)
  *F24H 9/14* (2006.01)
  *F24H 1/22* (2022.01)

(52) U.S. Cl.
  CPC ............... *F24H 9/14* (2013.01); *F25B 29/00* (2013.01); *G05D 7/0623* (2013.01); *G05D 23/1923* (2013.01)

(56) References Cited

U.S. PATENT DOCUMENTS

| | | | |
|---|---|---|---|
| 10,101,730 B2* | 10/2018 | Wenzel | G05B 19/418 |
| 10,101,731 B2* | 10/2018 | Asmus | G05B 19/418 |
| 10,175,681 B2* | 1/2019 | Wenzel | G05B 15/02 |
| 10,809,705 B2* | 10/2020 | Przybylski | G05B 19/41885 |
| 10,871,756 B2 | 12/2020 | Johnson et al. | |
| 10,901,440 B2* | 1/2021 | Pickard | G05D 23/1928 |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 11,415,330 B2* | 8/2022 | Costakis | F24F 5/0003 |
| 2003/0055798 A1 | 3/2003 | Hittle et al. | |
| 2007/0295286 A1* | 12/2007 | Donnelly | F24H 15/31 122/14.1 |
| 2008/0162077 A1* | 7/2008 | Chang | G06F 30/00 702/182 |
| 2008/0216771 A1* | 9/2008 | Paine | F24D 19/1009 122/14.2 |
| 2011/0100618 A1* | 5/2011 | Carlson | H05K 7/2079 165/104.33 |
| 2012/0174609 A1* | 7/2012 | Matsuo | F24F 11/62 165/200 |
| 2014/0060457 A1* | 3/2014 | Hill | C02F 1/008 122/14.1 |
| 2015/0316903 A1* | 11/2015 | Asmus | G06Q 10/04 700/291 |
| 2015/0316907 A1* | 11/2015 | Elbsat | G05B 15/02 700/275 |
| 2015/0316946 A1* | 11/2015 | Wenzel | G06Q 10/04 700/291 |
| 2016/0169539 A1* | 6/2016 | Deivasigamani | F24H 9/2007 237/8 A |
| 2016/0178221 A1* | 6/2016 | Thornton | F24H 15/223 700/295 |
| 2016/0209852 A1* | 7/2016 | Beyhaghi | G05D 23/1917 |
| 2016/0299999 A1* | 10/2016 | James | G06F 30/20 |
| 2017/0031962 A1* | 2/2017 | Turney | G05D 23/1905 |
| 2017/0343267 A1* | 11/2017 | Erpelding | F25B 49/02 |
| 2018/0135868 A1* | 5/2018 | Johnson, Jr. | F24D 19/1012 |
| 2019/0072943 A1* | 3/2019 | Przybylski | G06Q 50/06 |
| 2019/0163213 A1* | 5/2019 | Ostrye | F24F 11/65 |
| 2020/0116415 A1* | 4/2020 | Erpelding | F25B 25/005 |
| 2020/0341434 A1* | 10/2020 | Beaty | F24D 10/00 |
| 2021/0158975 A1* | 5/2021 | Turney | G16Y 40/20 |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

(56) References Cited

OTHER PUBLICATIONS

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
EPO Search Opinion EP Appl. Ser. No. EP 22177772.5 dated Sep. 26, 2022 (6 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review, 2013 IEEE International Conference on Automation Science and Engineering, Model Predictive Control for HVAC Systems—A Review," 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).

(56) References Cited

OTHER PUBLICATIONS

Yao et al., "Global Optimization of a Central Air-Conditioning System Using Decomposition-Coordination Method," Energy and Buildings, May 2010, vol. 42, No. 5 (pp. 570-583).

* cited by examiner

CENTRAL PLANT WITH SECONDARY STRONG PREVENTION

BACKGROUND

The present disclosure relates generally to the operation of a central plant for serving building thermal energy loads. The present disclosure relates more particularly to systems and methods for distributing building thermal energy loads across a number of subplants configured to serve the building thermal energy loads.

A central plant may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building. A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits deliver the heated or chilled fluid to air handlers located on the rooftop of the building or to individual floors or zones of the building. The air handlers push air past heat exchangers (e.g., heating coils or cooling coils) through which the working fluid flows to provide heating or cooling to the air. The working fluid returns to the central plant to receive further heating or cooling and the cycle continues.

High efficiency equipment can help reduce the amount of energy consumed by a central plant; however, the effectiveness of such equipment is highly dependent on the control technology that is used to distribute the load across the multiple subplants. For example, operating heat pump chillers instead of conventional chillers and a water heater may be more efficient when energy prices are high. It is difficult and challenging to determine when and to what extent each of the multiple subplants should be used to minimize energy cost. If electrical demand charges are considered, the optimization is even more complicated. Thermal energy storage can be used to store energy for later use. When coupled with real-time pricing for electricity and demand charges, thermal energy storage provides a degree of flexibility that can be used to greatly decrease energy costs by shifting production to low cost times or when other electrical loads are lower so that a new peak demand is not set.

SUMMARY

One implementation of the present disclosure is a central plant. The central plant includes a plurality of subplants including a chiller configured to output supply water at a supply water temperature, a sensor configured obtain a measurement of the supply water temperature, and a control system. The control system is configured to calculate an additional load factor based on the measurement of the supply water temperature and a supply water temperature setpoint, obtain an actual load for the chiller, calculate an effective load based on the additional load factor and the actual load, generate load allocations for the plurality of subplants based on the effective load, and control the plurality of subplants to operate in accordance with the load allocations.

In some embodiments, the additional load factor is positive when the supply water temperature deviates from the supply water temperature setpoint. In some embodiments, the additional load factor is zero when the measurement of the supply water temperature is greater than or equal to the supply water temperature setpoint. The additional load factor is non-zero when the measurement of the supply water temperature is less than a sum of the supply water temperature setpoint and an offset.

In some embodiments, when the additional load factor is non-zero, the additional load factor includes a scaling factor multiplied by a difference between the measurement of the supply water temperature and a sum of the supply water temperature setpoint and an offset. In some embodiments, the control system is configured to generate load allocations based on the effective load by generating a predicted load for the central plant based on the effective load and allocating the predicted load amongst the plurality of subplants.

In some embodiments, the additional load factor causes the control system to generate the load allocations for the plurality of subplants by increasing a load allocation for a first device of the plurality of subplants to compensate for a failure of the chiller to meet a load allocated to the chiller.

Another implementation of the present disclosure is a method for controlling building equipment that includes a chiller. The method includes operating the chiller to output supply water at a supply water temperature, obtaining a measurement of the supply water temperature, calculating an additional load factor based on the measurement of the supply water temperature measurement and a supply water temperature setpoint, obtaining an actual load for the chiller, calculating an effective load based on the additional load factor and the actual load, generating load allocations for the building equipment based on the effective load, and controlling the building equipment in accordance with the load allocations.

In some embodiments, the additional load factor is positive when the supply water temperature deviates from the supply water temperature setpoint. In some embodiments, calculating the additional load factor includes setting the additional load factor to zero when the measurement of the supply water temperature is greater than or equal to the supply water temperature setpoint. In some embodiments, calculating the additional load factor, when the measurement of the supply water temperature is less than a sum of the supply water temperature setpoint and an offset, includes calculating the sum of the supply water temperature setpoint and the offset, determining a difference between the measurement of the supply water temperature and the sum, and multiplying the difference by a scaling factor.

In some embodiments, generating load allocations includes generating a predicted load for the building equipment based on the effective load and allocating the predicted load amongst the building equipment. In some embodiments, generating load allocations for the building equipment based on the effective load includes increasing a load allocated to a first device of the building equipment to compensate for a failure of the chiller to meet a load allocated to the chiller.

Another implementation of the present disclosure is a method for controlling a central plant. The method includes operating a first subplant of the central plant to output a first resource with a measureable characteristic, obtaining a measurement of the measureable characteristic and a setpoint for the measureable characteristic, calculating an additional load factor based on the measurement and the setpoint, obtaining an actual load for the first subplant, calculating an effective load for the first subplant based on a sum of the actual load and the additional load factor, generating load allocations for the central plant based on the effective load, and controlling the central plant based on the load allocations.

In some embodiments, the method includes controlling the first subplant with a control loop configured to drive the measureable characteristic towards the setpoint. In some embodiments, the additional load factor is positive when the measurement deviates from the setpoint. In some embodiments, calculating the additional load factor includes setting the additional load factor to zero when the measurement is greater than or equal to the setpoint.

In some embodiments, calculating the additional load factor includes, when the measurement is less than a sum of the setpoint and an offset, calculating the sum of the supply water temperature setpoint and the offset, determining a difference between the measurement and the sum, and multiplying the difference by a scaling factor.

In some embodiments, generating load allocations include generating a predicted load for the central plant based on the effective load and allocating the predicted load amongst a plurality of subplants of the central plant. The plurality of subplants include the first subplant.

In some embodiments, the method includes generating load allocations for the central plant based on the effective load includes increasing a load allocated to a second subplant of the central plant to compensate for a failure of the first subplant to meet a load allocated to the first subplant. In some embodiments, the first subplant includes an electric centrifugal chiller.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
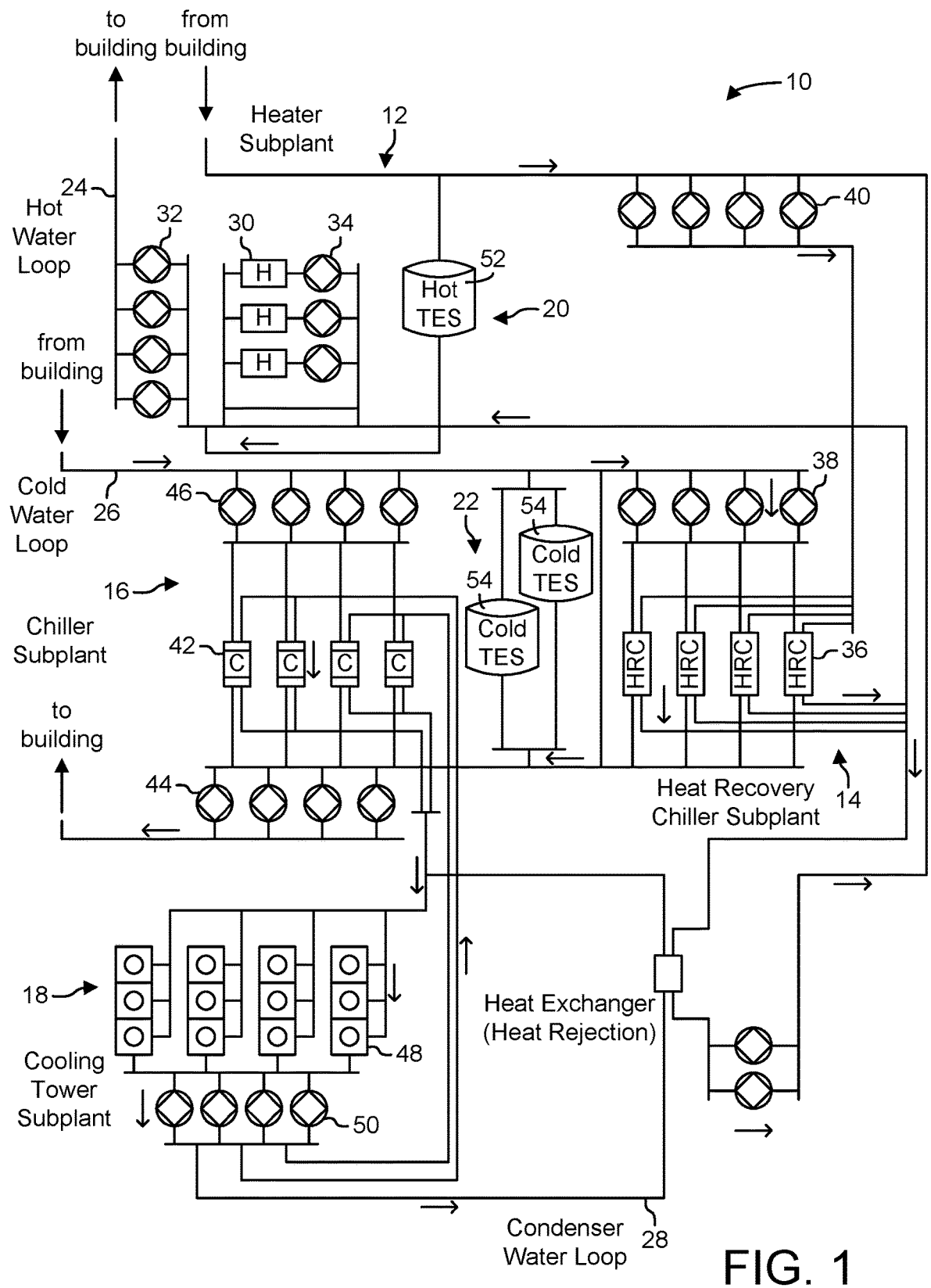
FIG. 1 is a schematic diagram of a central plant having a plurality of subplants including a heater subplant, heat recovery chiller subplant, a chiller subplant, a hot thermal energy storage subplant, and a cold thermal energy storage subplant, according to an exemplary embodiment.

Referring generally to the FIGURES, systems and methods for optimizing a central plant are shown, according to an exemplary embodiment. A central plant may include may include various types of equipment configured to serve the thermal energy loads of a building or campus (i.e., a system of buildings). For example, a central plant may include heaters, chillers, heat recovery chillers, cooling towers, or other types of equipment configured to provide heating or cooling for the building or campus. The central plant equipment may be divided into various groups configured to perform a particular function. Such groups of central plant equipment are referred to herein as subplants. For example, a central plant may include a heater subplant, a chiller subplant, a heat recovery chiller subplant, a cold thermal energy storage subplant, a hot thermal energy storage subplant, etc. The subplants may consume resources from one or more utilities (e.g., water, electricity, natural gas, etc.) to serve the energy loads of the building or campus. Optimizing the central plant may include operating the various subplants in such a way that results in a minimum monetary cost to serve the building energy loads.

In some embodiments, the central plant optimization is a cascaded optimization process including a high level optimization and a low level optimization. The high level optimization may determine an optimal distribution of energy loads across the various subplants. For example, the high level optimization may determine a thermal energy load to be produced by each of the subplants at each time element in an optimization period. In some embodiments, the high level optimization includes optimizing a high level cost function that expresses the monetary cost of operating the subplants as a function of the resources consumed by the subplants at each time element of the optimization period. The low level optimization may use the optimal load distribution determined by the high level optimization to determine optimal operating statuses for individual devices within each subplant. Optimal operating statuses may include, for example, on/off states and/or operating setpoints for individual devices of each subplant. The low level optimization may include optimizing a low level cost function that expresses the energy consumption of a subplant as a function of the on/off states and/or operating setpoints for the individual devices of the subplant.

The present disclosure describes systems and methods for performing the high level optimization. A high level optimizer may perform the high level optimization. In various embodiments, the high level optimizer may be a component of a central plant controller configured for real-time control of a physical plant or a component of a planning tool configured to optimize a simulated plant (e.g., for planning or design purposes).

In some embodiments, the high level optimizer uses a linear programming framework to perform the high level optimization. Advantageously, linear programming can efficiently handle complex optimization scenarios and can optimize over a relatively long optimization period (e.g., days, weeks, years, etc.) in a relatively short timeframe (e.g., seconds, milliseconds, etc.). In other embodiments, the high level optimizer may use any of a variety of other optimization frameworks (e.g., quadratic programming, linear-fractional programming, nonlinear programming, combinatorial algorithms, etc.).

An objective function defining the high level optimization problem can be expressed in the linear programming framework as:

$$\underset{x}{\mathrm{argmin}}\ c^T x;\ \text{subject to}\ Ax \le b,\ Hx = g$$

where c is a cost vector, x is a decision matrix, A and b are a matrix and vector (respectively) which describe inequality constraints on the variables in the decision matrix x, and H and g are a matrix and vector (respectively) which describe equality constraints on the variables in the decision matrix x. The variables in the decision matrix x may include the subplant loads assigned to the various subplants and/or an amount of resource consumption by the subplants at each time element in the optimization period. The high level optimizer may define the cost vector c and the optimization constraints (e.g., the matrices A and H and the vectors b and g) and solve the optimization problem to determine optimal subplant load values for the variables in the decision matrix x.

The high level optimizer may receive, as an input, predicted or planned energy loads for the building or campus for each of the time elements in the optimization period. The high level optimizer may use the predicted or planned loads to formulate the constraints on the high level optimization problem (e.g., to define the matrices A and H and the vectors b and g). The high level optimizer may also receive utility rates (e.g., energy prices, water prices, demand charges, etc.) defining the cost of each resource consumed by the central plant to serve the energy loads. The utility rates may be time-variable rates (e.g., defining a different rates at different times) and may include demand charges for various time periods. The high level optimizer may use the utility rates to define the cost vector c.

The high level optimizer may receive or generate subplant curves for each of the subplants. A subplant curve defines the resource consumption of a subplant as a function of the load produced by the subplant. The subplant curves may be generated by a low level optimizer or by the high level optimizer based on operating data points received from the low level optimizer. The high level optimizer may use the subplant curves to constrain the resource consumption of each subplant to a value along the corresponding subplant curve (e.g., based on the load produced by the subplant). For example, the high level optimizer may use the subplant curves to define the optimization constraints (e.g., the matrices A and H and the vectors b and g) on the high level optimization problem.

In some embodiments, the high level optimizer is configured to incorporate a demand charge into the high level optimization process. The demand charge is an additional charge imposed by some utility providers based on the maximum rate of resource consumption during an applicable demand charge period. For example, an electric demand charge may be provided as a cost $c_{demand}$ per unit power and may be multiplied by the peak electricity usage $\max(P_{elec,k})$ during a demand charge period to determine the demand charge. Conventional systems have been unable to incorporate a demand charge into a linear optimization framework due to the nonlinear max( ) function used to calculate the demand charge.

Advantageously, the high level optimizer of the present disclosure may be configured to incorporate the demand charge into the linear optimization framework by modifying the decision matrix x, the cost vector c, and/or the A matrix and the b vector which describe the inequality constraints. For example, the high level optimizer may modify the decision matrix x by adding a new decision variable $x_{peak}$ representing the peak power consumption within the optimization period. The high level optimizer may modify the cost vector c with the demand charge rate $c_{demand}$ such that the demand charge rate $c_{demand}$ is multiplied by the peak power consumption $x_{peak}$. The high level optimizer may generate and/or impose constraints to ensure that the peak power consumption $x_{peak}$ is greater than or equal to the electric demand for each time step in the demand charge period and greater than or equal to its previous value during the demand charge period.

In some embodiments, the high level optimizer is configured to incorporate a load change penalty into the high level optimization process. The load change penalty may represent an increased cost (e.g., equipment degradation, etc.) resulting from a rapid change in the load assigned to a subplant. The high level optimizer may incorporate the load change penalty by modifying the decision matrix x, the cost vector c, and/or the optimization constraints. For example, the high level optimizer may modify the decision matrix x by adding load change variables δ for each subplant. The load change variables may represent the change in subplant load for each subplant from one time element to the next. The high level optimizer may modify the cost vector c to add a cost associated with changing the subplant loads. In some embodiments, the high level optimizer adds constraints that constrain the load change variables δ to the corresponding change in the subplant load. These and other enhancements to the high level optimization process may be incorporated into the linear optimization framework, as described in greater detail below.

Referring now to FIG. 1, a diagram of a central plant 10 is shown, according to an exemplary embodiment. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subsystems 12-22.

Although central plant 10 is shown and described as heating and cooling water for circulation to a building, it is understood that any other type of working fluid (e.g., glycol, $CO_2$, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 includes an isolation valve associated therewith. In various embodiments, isolation valves may be integrated with the pumps or positioned upstream or downstream of the pumps to control the fluid flows in central plant 10. In other embodiments, more, fewer, or different types of devices may be included in central plant 10.

Figure 2:
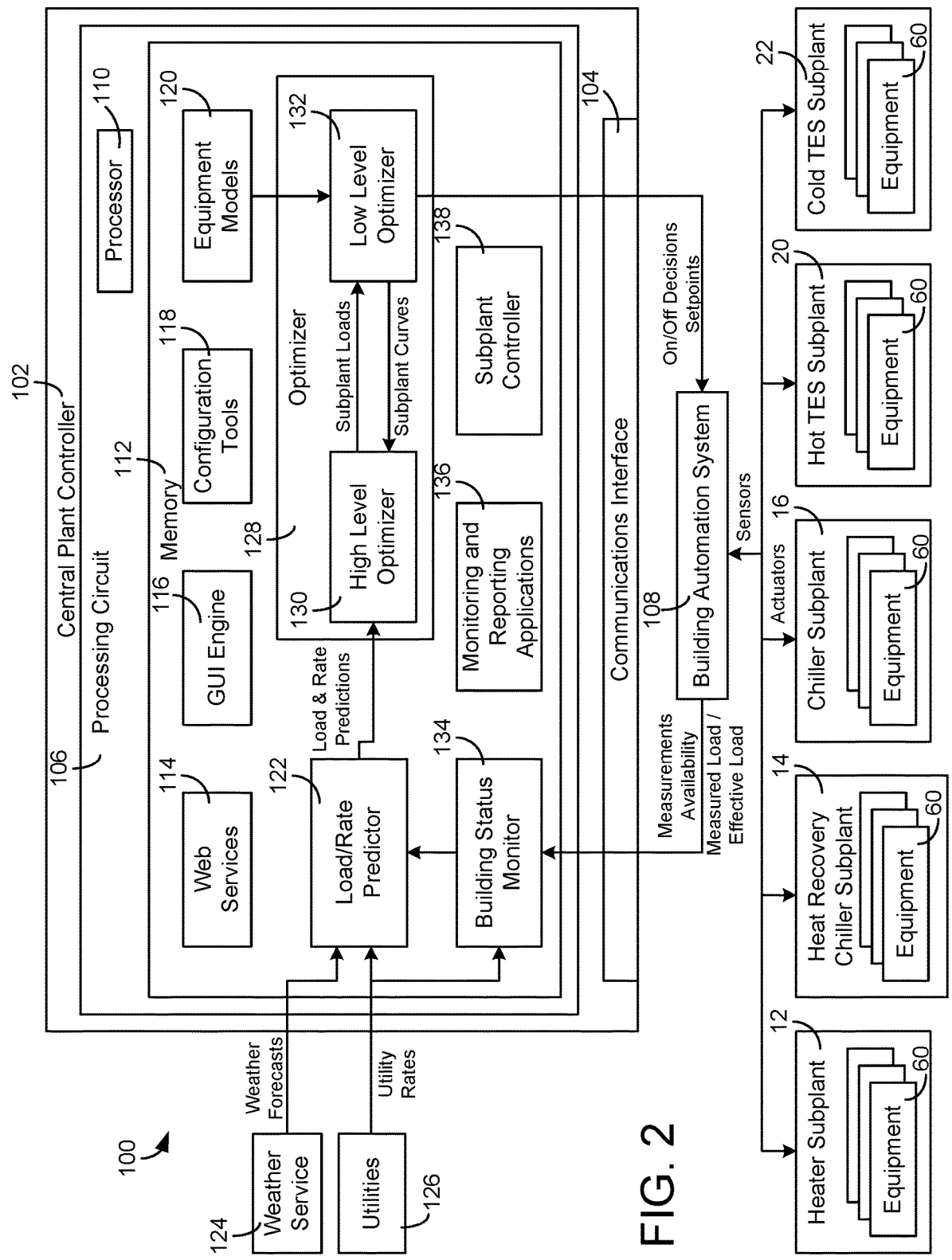
FIG. 2 is a block diagram illustrating a central plant system including a central plant controller that may be used to control the central plant of FIG. 1, according to an exemplary embodiment.

Referring now to FIG. 2, a block diagram illustrating a central plant system 100 is shown, according to an exemplary embodiment. System 100 is shown to include a central plant controller 102, a building automation system 108, and a plurality of subplants 12-22. Subplants 12-22 may be the same as previously described with reference to FIG. 1. For example, subplants 12-22 are shown to include a heater subplant 12, a heat recovery chiller subplant 14, a chiller subplant 16, a hot TES subplant 20, and a cold TES subplant 22.

Each of subplants 12-22 is shown to include equipment 60 that can be controlled by central plant controller 102 and/or building automation system 108 to optimize the performance of central plant 10. Equipment 60 may include, for example, heating devices 30, chillers 42, heat recovery heat exchangers 36, cooling towers 48, thermal energy storage devices 52, 54, pumps 32, 44, 50, valves 34, 38, 46, and/or other devices of subplants 12-22. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 102.

In some embodiments, one or more of subplants 12-22 includes a subplant level controller configured to control the equipment 60 of the corresponding subplant. For example, central plant controller 102 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints.

Building automation system (BAS) 108 may be configured to monitor conditions within a controlled building or building zone. For example, BAS 108 may receive input from various sensors (e.g., temperature sensors, humidity sensors, airflow sensors, voltage sensors, etc.) distributed throughout the building and may report building conditions to central plant controller 102. Building conditions may include, for example, a temperature of the building or a zone of the building, a power consumption (e.g., electric load) of the building, a state of one or more actuators configured to affect a controlled state within the building, or other types of information relating to the controlled building. BAS 108 may operate subplants 12-22 to affect the monitored conditions within the building and to serve the thermal energy loads of the building.

BAS 108 may receive control signals from central plant controller 102 specifying on/off states and/or setpoints for equipment 60. BAS 108 may control equipment 60 (e.g., via actuators, power relays, etc.) in accordance with the control signals provided by central plant controller 102. For example, BAS 108 may operate equipment 60 using closed loop control to achieve the setpoints specified by central plant controller 102. In various embodiments, BAS 108 may be combined with central plant controller 102 or may be part of a separate building management system. According to an exemplary embodiment, BAS 108 is a METASYS® brand building management system, as sold by Johnson Controls, Inc.

Central plant controller 102 may monitor the status of the controlled building using information received from BAS 108. Central plant controller 102 may be configured to predict the thermal energy loads (e.g., heating loads, cooling loads, etc.) of the building for plurality of time steps in a prediction window (e.g., using weather forecasts from a weather service). Central plant controller 102 may generate on/off decisions and/or setpoints for equipment 60 to minimize the cost of energy consumed by subplants 12-22 to serve the predicted heating and/or cooling loads for the duration of the prediction window. Central plant controller 102 may be configured to carry out process 1100 (FIG. 11) and other processes described herein. According to an exemplary embodiment, central plant controller 102 is integrated within a single computer (e.g., one server, one housing, etc.). In various other exemplary embodiments, central plant controller 102 can be distributed across multiple servers or computers (e.g., that can exist in distributed locations). In another exemplary embodiment, central plant controller 102 may be integrated with a smart building manager that manages multiple building systems and/or combined with BAS 108.

Central plant controller 102 is shown to include a communications interface 104 and a processing circuit 106. Communications interface 104 may include wired or wireless interfaces (e.g., jacks, antennas, transmitters, receivers, transceivers, wire terminals, etc.) for conducting data communications with various systems, devices, or networks. For example, communications interface 104 may include an Ethernet card and port for sending and receiving data via an Ethernet-based communications network and/or a WiFi transceiver for communicating via a wireless communications network. Communications interface 104 may be configured to communicate via local area networks or wide area networks (e.g., the Internet, a building WAN, etc.) and may use a variety of communications protocols (e.g., BACnet, IP, LON, etc.).

Communications interface 104 may be a network interface configured to facilitate electronic data communications between central plant controller 102 and various external systems or devices (e.g., BAS 108, subplants 12-22, etc.). For example, central plant controller 102 may receive information from BAS 108 indicating one or more measured states of the controlled building (e.g., temperature, humidity, electric loads, etc.) and one or more states of subplants 12-22 (e.g., equipment status, power consumption, equipment availability, etc.). Communications interface 104 may receive inputs from BAS 108 and/or subplants 12-22 and may provide operating parameters (e.g., on/off decisions, setpoints, etc.) to subplants 12-22 via BAS 108. The operating parameters may cause subplants 12-22 to activate, deactivate, or adjust a setpoint for various devices of equipment 60.

Still referring to FIG. 2, processing circuit 106 is shown to include a processor 110 and memory 112. Processor 110 may be a general purpose or specific purpose processor, an application specific integrated circuit (ASIC), one or more field programmable gate arrays (FPGAs), a group of processing components, or other suitable processing components. Processor 110 may be configured to execute computer code or instructions stored in memory 112 or received from other computer readable media (e.g., CDROM, network storage, a remote server, etc.).

Memory 112 may include one or more devices (e.g., memory units, memory devices, storage devices, etc.) for storing data and/or computer code for completing and/or facilitating the various processes described in the present disclosure. Memory 112 may include random access memory (RAM), read-only memory (ROM), hard drive storage, temporary storage, non-volatile memory, flash memory, optical memory, or any other suitable memory for storing software objects and/or computer instructions. Memory 112 may include database components, object code components, script components, or any other type of information structure for supporting the various activities and information structures described in the present disclosure. Memory 112 may be communicably connected to processor 110 via processing circuit 106 and may include computer code for executing (e.g., by processor 106) one or more processes described herein.

Still referring to FIG. 2, memory 112 is shown to include a building status monitor 134. Central plant controller 102 may receive data regarding the overall building or building space to be heated or cooled with central plant 10 via building status monitor 134. In an exemplary embodiment, building status monitor 134 may include a graphical user interface component configured to provide graphical user interfaces to a user for selecting building requirements (e.g., overall temperature parameters, selecting schedules for the building, selecting different temperature levels for different building zones, etc.).

Central plant controller 102 may determine on/off configurations and operating setpoints to satisfy the building requirements received from building status monitor 134. In some embodiments, building status monitor 134 receives, collects, stores, and/or transmits cooling load requirements, building temperature setpoints, occupancy data, weather data, energy data, schedule data, and other building parameters. In some embodiments, building status monitor 134 stores data regarding energy costs, such as pricing information available from utilities 126 (energy charge, demand charge, etc.).

Still referring to FIG. 2, memory 112 is shown to include a load/rate predictor 122. Load/rate predictor 122 may be configured to predict the thermal energy loads ($\ell_k$) of the building or campus for each time step k (e.g., k=1 . . . n) of an optimization period. Load/rate predictor 122 is shown receiving weather forecasts from a weather service 124. In some embodiments, load/rate predictor 122 predicts the thermal energy loads $\ell_k$ as a function of the weather forecasts. In some embodiments, load/rate predictor 122 uses feedback from BAS 108 to predict loads $\ell_k$. Feedback from BAS 108 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 122 receives a measured electric load and/or previous measured load data from BAS 108 (e.g., via building status monitor 134). In some embodiments, as described below with reference to FIG. 4, the BAS 108 is configured to adjust the measured load to account for failure of a subplant to meet a load allocated to the subplant. Load/rate predictor 122 may predict loads $\ell_k$ as a function of a given weather forecast ($\hat{\phi}_w$), a day type (day), the time of day (t), and previous measured load data ($Y_{k-1}$). Such a relationship is expressed in the following equation:

$$\ell_k 32\ f(\hat{\phi}_w,\ day,\ t|Y_{k-1})$$

In some embodiments, load/rate predictor 122 uses a deterministic plus stochastic model trained from historical load data to predict loads $\ell_k$. Load/rate predictor 122 may use any of a variety of prediction methods to predict loads $\ell_k$ (e.g., linear regression for the deterministic portion and an AR model for the stochastic portion). Load/rate predictor 122 may predict one or more different types of loads for the building or campus. For example, load/rate predictor 122 may predict a hot water load $\ell_{Hot,k}$ and a cold water load $\ell_{Cold,k}$ for each time step k within the prediction window.

Load/rate predictor 122 is shown receiving utility rates from utilities 126. Utility rates may indicate a cost or price per unit of a resource (e.g., electricity, natural gas, water, etc.) provided by utilities 126 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period.

Utility rates may be actual rates received from utilities 126 or predicted utility rates estimated by load/rate predictor 122.

In some embodiments, the utility rates include demand charges for one or more resources provided by utilities 126. A demand charge may define a separate cost imposed by utilities 126 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimizer 128 may be configured to account for demand charges in the high level optimization process performed by high level optimizer 130. Utilities 126 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 122 may store the predicted loads $\hat{\ell}_k$ and the utility rates in memory 112 and/or provide the predicted loads $\hat{\ell}_k$ and the utility rates to optimizer 128. Optimizer 128 may use the predicted loads $\hat{\ell}_k$ and the utility rates to determine an optimal load distribution for subplants 12-22 and to generate on/off decisions and setpoints for equipment 60.

Still referring to FIG. 2, memory 112 is shown to include an optimizer 128. Optimizer 128 may perform a cascaded optimization process to optimize the performance of central plant 10. For example, optimizer 128 is shown to include a high level optimizer 130 and a low level optimizer 132. High level optimizer 130 may control an outer (e.g., subplant level) loop of the cascaded optimization. High level optimizer 130 may determine an optimal distribution of thermal energy loads across subplants 12-22 for each time step in the prediction window in order to optimize (e.g., minimize) the cost of energy consumed by subplants 12-22. Low level optimizer 132 may control an inner (e.g., equipment level) loop of the cascaded optimization. Low level optimizer 132 may determine how to best run each subplant at the load setpoint determined by high level optimizer 130. For example, low level optimizer 132 may determine on/off states and/or operating setpoints for various devices of equipment 60 in order to optimize (e.g., minimize) the energy consumption of each subplant while meeting the thermal energy load setpoint for the subplant. The cascaded optimization process is described in greater detail with reference to FIG. 3.

Still referring to FIG. 2, memory 112 is shown to include a subplant controller 138. Subplant controller 138 may store historical data regarding past operating statuses, past operating setpoints, and instructions for calculating and/or implementing control parameters for subplants 12-22. Subplant controller 138 may also receive, store, and/or transmit data regarding the conditions of individual devices of equipment 60, such as operating efficiency, equipment degradation, a date since last service, a lifespan parameter, a condition grade, or other device-specific data. Subplant controller 138 may receive data from subplants 12-22 and/or BAS 108 via communications interface 104. Subplant controller 138 may also receive and store on/off statuses and operating setpoints from low level optimizer 132.

Data and processing results from optimizer 128, subplant controller 138, or other modules of central plant controller 102 may be accessed by (or pushed to) monitoring and reporting applications 136. Monitoring and reporting applications 136 may be configured to generate real time "system health" dashboards that can be viewed and navigated by a user (e.g., a central plant engineer). For example, monitoring and reporting applications 136 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 2, central plant controller 102 may include one or more GUI servers, web services 114, or GUI engines 116 to support monitoring and reporting applications 136. In various embodiments, applications 136, web services 114, and GUI engine 116 may be provided as separate components outside of central plant controller 102 (e.g., as part of a smart building manager). Central plant controller 102 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 102 may be configured to provide the results of any such processing to other databases, tables, XML files, or other data structures for further querying, calculation, or access by, for example, external monitoring and reporting applications.

Central plant controller 102 is shown to include configuration tools 118. Configuration tools 118 can allow a user to define (e.g., via graphical user interfaces, via prompt-driven "wizards," etc.) how central plant controller 102 should react to changing conditions in the central plant subsystems. In an exemplary embodiment, configuration tools 118 allow a user to build and store condition-response scenarios that can cross multiple central plant devices, multiple building systems, and multiple enterprise control applications (e.g., work order management system applications, entity resource planning applications, etc.). For example, configuration tools 118 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 118 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 3:
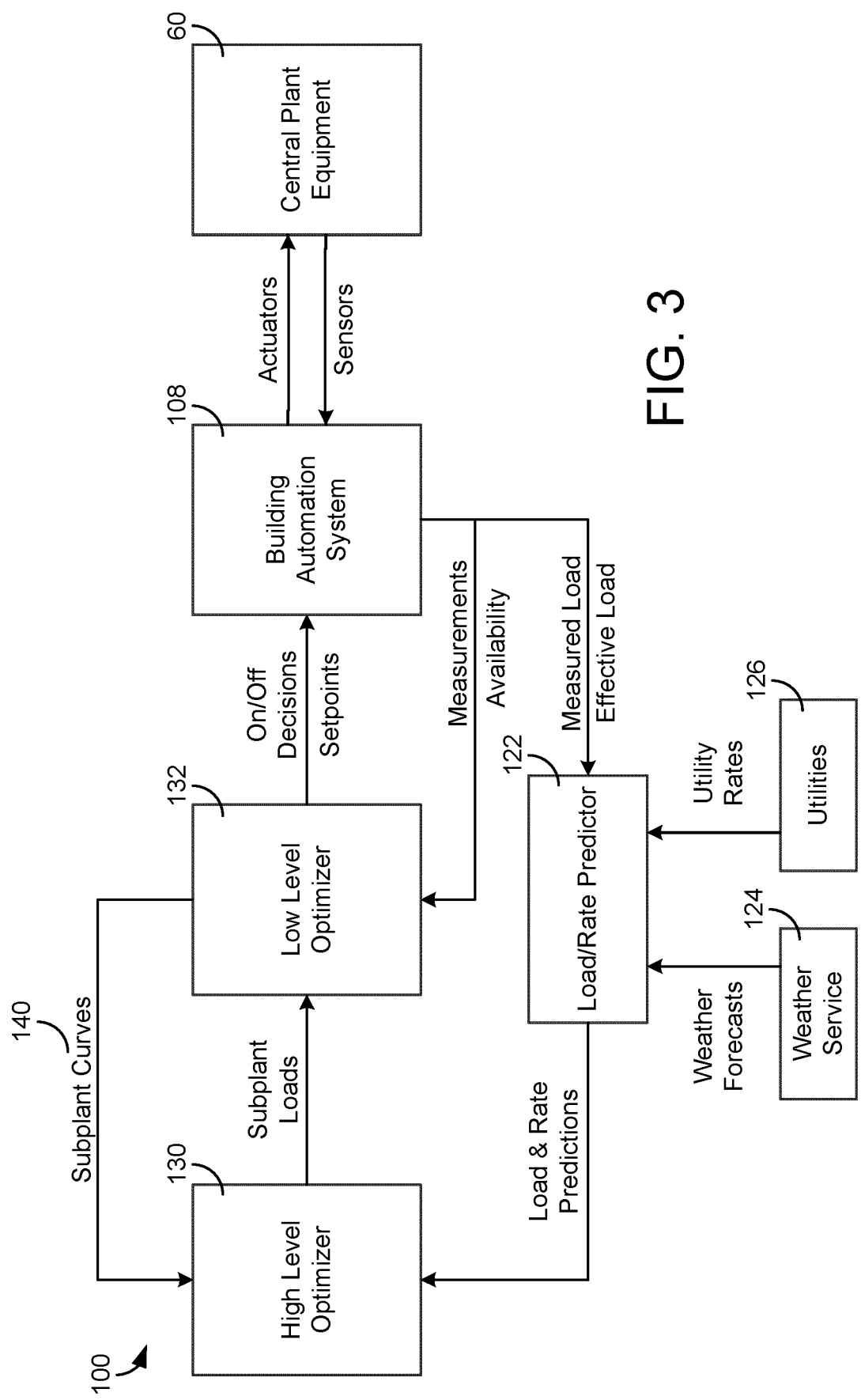
FIG. 3 is block diagram illustrating a portion of central plant system of FIG. 2 in greater detail, showing a load/rate predictor, a high level optimizer, a low level optimizer, a building automation system, and central plant equipment, according to an exemplary embodiment.

Referring now to FIG. 3, a block diagram illustrating a portion of central plant system 100 in greater detail is shown, according to an exemplary embodiment. FIG. 3 illustrates the cascaded optimization process performed by optimizer 128 to optimize the performance of central plant 10. In the cascaded optimization process, high level optimizer 130 performs a subplant level optimization that determines an optimal distribution of thermal energy loads across subplants 12-22 for each time step in the prediction window in order to minimize the cost of energy consumed by subplants 12-22. Low level optimizer 132 performs an equipment level optimization that determines how to best run each subplant at the subplant load setpoint determined by high level optimizer 130. For example, low level optimizer 132 may determine on/off states and/or operating setpoints for various devices of equipment 60 in order to optimize the energy consumption of each subplant while meeting the thermal energy load setpoint for the subplant.

One advantage of the cascaded optimization process performed by optimizer 128 is the optimal use of computational time. For example, the subplant level optimization performed by high level optimizer 130 may use a relatively long time horizon due to the operation of the thermal energy storage. However, the equipment level optimization performed by low level optimizer 132 may use a much shorter time horizon or no time horizon at all since the low level system dynamics are relatively fast (compared to the dynamics of the thermal energy storage) and the low level control of equipment 60 may be handled by BAS 108. Such an optimal use of computational time makes it possible for optimizer 128 to perform the central plant optimization in a short amount of time, allowing for real-time predictive control. For example, the short computational time enables optimizer 128 to be implemented in a real-time planning tool with interactive feedback.

Another advantage of the cascaded optimization performed by optimizer 128 is that the central plant optimization problem can be split into two cascaded subproblems. The cascaded configuration provides a layer of abstraction that allows high level optimizer 130 to distribute the thermal energy loads across subplants 12-22 without requiring high level optimizer 130 to know or use any details regarding the particular equipment configuration within each subplant. The interconnections between equipment 60 within each subplant may be hidden from high level optimizer 130 and handled by low level optimizer 132. For purposes of the subplant level optimization performed by high level optimizer 130, each subplant may be completely defined by one or more subplant curves 140.

Still referring to FIG. 3, low level optimizer 132 may generate and provide subplant curves 140 to high level optimizer 130. Subplant curves 140 may indicate the rate of utility use by each of subplants 12-22 (e.g., electricity use measured in kW, water use measured in L/s, etc.) as a function of the subplant load. Exemplary subplant curves are shown and described in greater detail with reference to FIGS. 5A-8. In some embodiments, low level optimizer 132 generates subplant curves 140 based on equipment models 120 (e.g., by combining equipment models 120 for individual devices into an aggregate curve for the subplant). Low level optimizer 132 may generate subplant curves 140 by running the low level optimization process for several different loads and weather conditions to generate multiple data points. Low level optimizer 132 may fit a curve to the data points to generate subplant curves 140. In other embodiments, low level optimizer 132 provides the data points to high level optimizer 132 and high level optimizer 132 generates the subplant curves using the data points.

High level optimizer 130 may receive the load and rate predictions from load/rate predictor 122 and the subplant curves 140 from low level optimizer 132. The load predictions may be based on weather forecasts from weather service 124 and/or information from building automation system 108 (e.g., a current electric load of the building, measurements from the building, a history of previous loads, a setpoint trajectory, etc.). The utility rate predictions may be based on utility rates received from utilities 126 and/or utility prices from another data source. High level optimizer 130 may determine the optimal load distribution for subplants 12-22 (e.g., a subplant load for each subplant) for each time step the prediction window and provide the subplant loads as setpoints to low level optimizer 132. In some embodiments, high level optimizer 130 determines the subplant loads by minimizing the total operating cost of central plant 10 over the prediction window. In other words, given a predicted load and utility rate information from load/rate predictor 122, high level optimizer 130 may distribute the predicted load across subplants 12-22 over the optimization period to minimize operating cost.

In some instances, the optimal load distribution may include using TES subplants 20 and/or 22 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 20-22. The high level optimization may be described by the following equation:

$$\theta^*_{HL} = \underset{\theta_{HL}}{\mathrm{argmin}} J_{HL}(\theta_{HL})$$

where $\theta_{HL}^*$ contains the optimal high level decisions (e.g., the optimal load for each of subplants 12-22) for the entire optimization period and $J_{HL}$ is the high level cost function.

To find the optimal high level decisions $\theta_{HL}^*$, high level optimizer 132 may minimize the high level cost function $J_{HL}$. The high level cost function $J_{HL}$ may be the sum of the economic costs of each utility consumed by each of subplants 12-22 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \underset{n_h}{\max}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \max_{n_h} (u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions lead to both equality and inequality constraints on the high level optimization problem, as described in greater detail with reference to FIG. 4.

Still referring to FIG. 3, low level optimizer 132 may use the subplant loads determined by high level optimizer 130 to determine optimal low level decisions $\theta_{LL}^*$ (e.g. binary on/off decisions, flow setpoints, temperature setpoints, etc.) for equipment 60. The low level optimization process may be performed for each of subplants 12-22. Low level optimizer 132 may be responsible for determining which devices of each subplant to use and/or the operating setpoints for such devices that will achieve the subplant load setpoint while minimizing energy consumption. The low level optimization may be described using the following equation:

$$\theta_{LL}^* = \operatorname*{argmin}_{\theta_{LL}} J_{LL}(\theta_{LL})$$

where $\theta_{LL}^*$ contains the optimal low level decisions and $J_{LL}$ is the low level cost function.

To find the optimal low level decisions $\theta_{LL}^*$, low level optimizer 132 may minimize the low level cost function $J_{LL}$. The low level cost function $J_{LL}$ may represent the total energy consumption for all of equipment 60 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 60 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 132 may minimize the low level cost function $J_{LL}$ subject to inequality constraints based on the capacities of equipment 60 and equality constraints based on energy and mass balances. In some embodiments, the optimal low level decisions $\theta_{LL}^*$ are constrained by switching constraints defining a short horizon for maintaining a device in an on or off state after a binary on/off switch. The switching constraints may prevent devices from being rapidly cycled on and off. In some embodiments, low level optimizer 132 performs the equipment level optimization without considering system dynamics. The optimization process may be slow enough to safely assume that the equipment control has reached its steady-state. Thus, low level optimizer 132 may determine the optimal low level decisions $\theta_{LL}^*$ at an instance of time rather than over a long horizon.

Low level optimizer 132 may determine optimum operating statuses (e.g., on or off) for a plurality of devices of equipment 60. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 132 may also determine optimum operating setpoints for equipment using nonlinear optimization. Nonlinear optimization may identify operating setpoints that further minimize the low level cost function $J_{LL}$. Low level optimizer 132 may provide the on/off decisions and setpoints to building automation system 108 for use in controlling the central plant equipment 60.

In some embodiments, the low level optimization performed by low level optimizer 132 is the same or similar to the low level optimization process described in U.S. patent application Ser. No. 14/634,615 titled "Low Level Central Plant Optimization" and filed on Feb. 27, 2015. The entire disclosure of U.S. patent application Ser. No. 14/634,615 is incorporated by reference herein.

Figure 4:
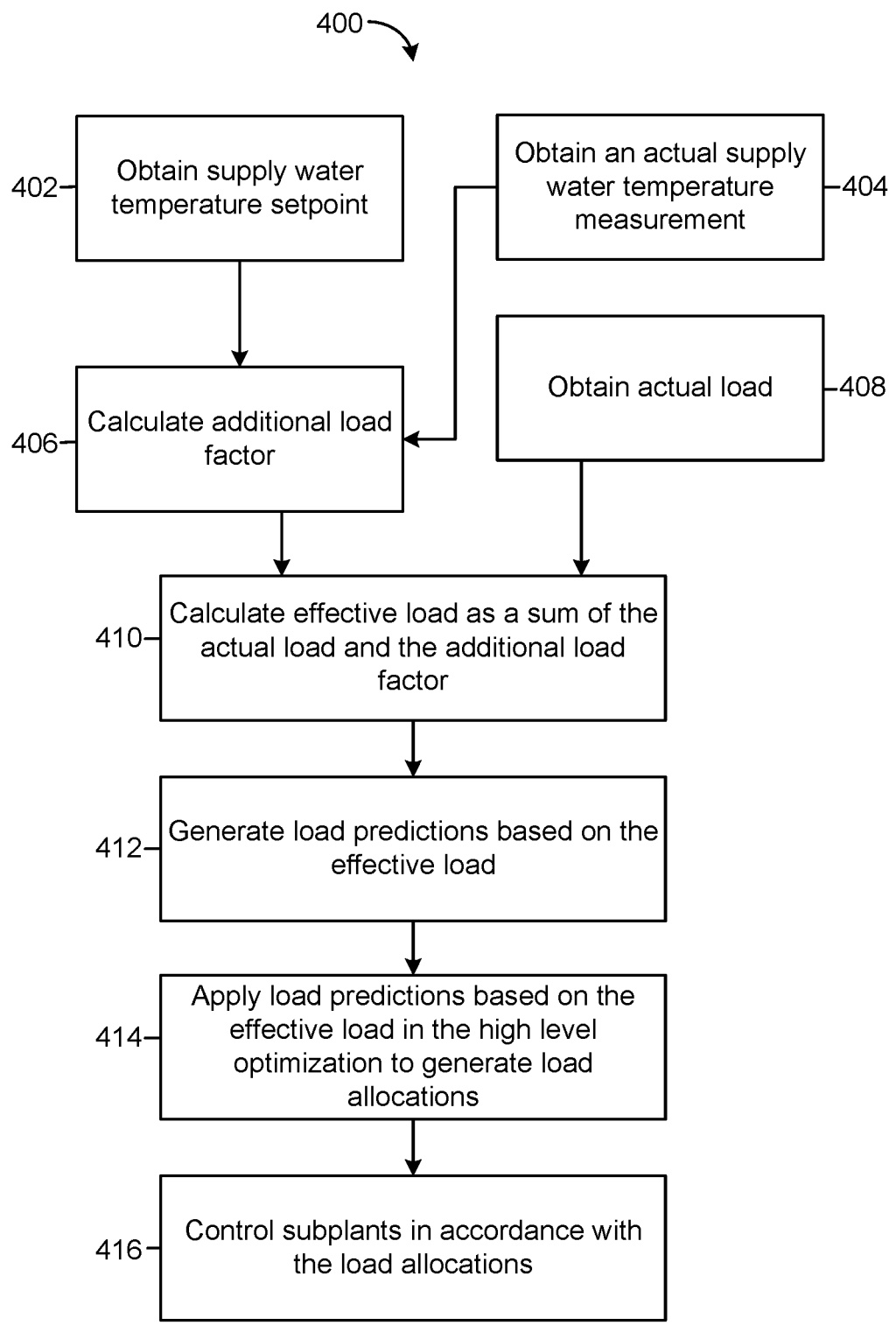
FIG. 4, a flowchart of a process for secondary strong prevention in the central plant system of FIG. 2, according to an exemplary embodiment.

Referring now to FIG. 4, a flowchart of a process 400 for adjusting measured loads to account for an inability of a subplant to meet a load allocated to the subplant is shown, according to an exemplary embodiment. As described above, the high level optimizer 130 is configured to allocate loads to various subplants. The high level optimizer 130 relies on predefined capacity for each subplant to set a maximum constraint on the load that may be allocated to a given subplant. If the load allocated to the subplant is below the predefined capacity, the high level optimizer 130 assumes that the low level optimizer 132 will be able to generate control decisions to operate the subplant optimally to provide the allocated load. The low level optimizer 132 is configured to generate a setpoint for the subplant, and, in the embodiments described herein, is not configured to receive an indication that the setpoint is not being met by the subplant.

However, in some cases and/or under certain conditions, a subplant may be unable to provide the predefined capacity. For example, equipment wear, device faults, environmental conditions, or other factors may restrict a subplant from meeting the predefined capacity. In one scenario, a chiller may be controlled to a supply water temperature setpoint provided by the low level optimizer 132. In a circumstance where the chiller is unable to meet the load allocated thereto by the high level optimizer 130, the supply water temperature actually created by the chiller drifts away from the supply water temperature setpoint. In such a case, the central plant equipment 60 will fail to meet the total load required by a building or campus served by the central plant equipment 60. As described in detail below, process 400 provides a solution to this problem by adjusting the measured load provided to the load/rate predictor 122 to adjust for the gap between the predefined capacity of a subplant and the actual maximum capacity provided by the subplant in some embodiments. Process 400 thereby prevents loss of temperature control when a subplant begins to lose control, which may be referred to as secondary strong prevention in some embodiments.

Still referring to FIG. 4, an example process 400 is shown in which the subplant is a chiller, for example an electric centrifugal chiller. Accordingly, reference is made to a supply water temperature setpoint generated by the low level optimizer 132 and used to control the chiller and a supply water temperature actually output by the chiller. It should be understood that alternative embodiments of the process 400 may be apply to other types of equipment and various subplants where the relevant setpoints, outputs, etc. are in various units.

At step 402, the supply water temperature setpoint $T_{S_{sp}}$ is obtained. In the embodiments of FIGS. 2-3, the supply water temperature setpoint may be generated by the low level optimizer 132 based on a load allocation for a chiller determined by the high level optimizer 130. The low level optimizer 132 provides the supply water temperature setpoint to the BAS 108. The BAS 108 thereby obtains the supply water temperature setpoint, and, as described above, may control the chiller to attempt to match an actual supply water temperature to the supply water temperature setpoint.

At step 404, an actual supply water temperature $T_{S_{act}}$ measurement is obtained. For example, a sensor included with a chiller may measure the temperature of the supply water output by the chiller (i.e., the actual supply water temperature $T_{S_{act}}$) and provide the actual supply water temperature to the BAS 108. The BAS 108 thereby obtains the measurement of the actual supply water temperature. The BAS 108 may use $T_{S_{act}}$ in generate control signals for the chiller.

At step 406, an additional load factor $L_{Add}$ is calculated. The additional load factor facilitates an adjustment to account for failure of the chiller to operate to match $T_{S_{act}}$ to $T_{S_{sp}}$, i.e., to achieve the setpoint commanded by the low level optimizer 132. The additional load factor can be calculated as $L_{Add}=\max(T_{S_{act}}-(T_{S_{sp}}+\delta), 0) * \alpha$, where $\alpha$ is a scaling factor in units of tons per degree (e.g., tons/° F.) and $\delta$ is a maximum delta temperature (e.g., offset, preset constant) that allows for some deviation from the $T_{S_{sp}}$. When $T_{S_{act}} < T_{S_{sp}}+\delta$ (i.e., when the chiller is under control and achieving the setpoint), the additional load factor is zero. When $T_{S_{act}} > T_{S_{sp}}+\delta$ (i.e., when the chiller is out of control and cannot achieve the setpoint), the additional load factor is a positive multiple of $\alpha$ that increases linearly with the degree of separation between $T_{S_{act}}$ and $T_{S_{sp}}$. Advantageously, the additional load factor is calculated using points ($T_{S_{act}}$ and $T_{S_{sp}}$) already used for online control of the chiller, such that additional sensors do not need to be added to existing hardware to allow process 400. Via the following steps of process 400, the additional load factor is used to cause the high level optimizer 130 to adjust the load allocation to cause another subplant (e.g., another chiller) to compensate for the loss of the control of the chiller.

At step 408, an actual load $L_{act}$ is obtained. For example, the actual load may be measured by a sensor and provided to the BAS 108.

At step 410, an effective load $L_{Eff}$ is calculated as a sum of the actual load $L_{act}$ and the additional load factor $L_{Add}$. That is, $L_{Eff}=L_{act}+L_{Add}=L_{act}+\max(T_{S_{act}}-(T_{S_{sp}}+\delta), 0)*\alpha$. When the additional load factor is non-zero (i.e., when the chiller is out of control and cannot achieve the setpoint), the effective load $L_{Eff}$ is greater than the actual load $L_{act}$. The effective load $L_{Eff}$ may be calculated by the BAS 108 and provided to the load/rate predictor 122 as indicated in FIG. 3. Steps 402-410 may be repeated for a series of time steps to generate a time series of effective loads.

At step 412, load predictions are generated based on the effective load $L_{Eff}$. Various approaches for generating load predictions based on actual loads are described above and/or in U.S. patent application Ser. No. 14/717,593 filed May 20, 2015, incorporated by reference herein in its entirety. In step 412, the effective load $L_{Eff}$ is used in any such approach in place of the measured actual load. Accordingly, when $L_{Add}>0$, the load predictions generated at step 412 are higher than in a scenario where the load predictions are generated based on the actual load without the addition of $L_{Add}$.

At step 414, the load predictions based on the effective load $L_{Eff}$ are applied in a high level optimization to generate load allocations for subplant in a central plant. In the example of FIGS. 2-3, the load/rate predictor 122 provides the load predictions and rate predictions to the high level optimizer 130. The high level optimizer 130 uses the load predictions and the rate predictions as described above to generate subplant loads, and provides the subplant loads to the low level optimizer 132. Because the load predictions based on the effective load $L_{Eff}$ may be inflated as a consequence of the additional load factor $L_{Add}$, in some scenarios the increased load of the load predictions causes the high level optimizer 130 to allocate an increased load to a subplant.

At step 416, the subplants are controlled in accordance with the load allocations. For example, the low level optimizer 132 can generate on/off decisions and setpoints for devices of the central plant equipment 60. The central plant equipment 60 is thereby control to serve allocated loads that may be increased/inflated as a result of the additional load factor $L_{Add}$ in the effective load $L_{Eff}$ used to generate the load predictions.

In some scenarios, the increase in the allocated loads causes the low level optimizer 132 to generate a decision to turn on an additional subplant or device of central plant equipment 60 to meet the increased allocated load. For example, in a scenario where a first chiller is out of control (i.e., where the first chiller is failing to output a supply water temperature that meets the supply water temperature setpoint), the increase in the allocated loads may cause the low level optimizer 132 to turn on a second chiller and allocate some of the allocated load to the second chiller. The load on the first chiller may thereby be reduced to a level that the first chiller is capable of meeting. In such a scenario, the process 400 prevents ongoing loss of control of the first chiller, thereby increasing the reliability of the central plant equipment 60 in meeting the loads required by a building or campus served by the central plant equipment 60.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

In the example shown in FIG. 2, the various "optimizers", "monitors", "applications", "controllers", "services", etc. are provided as machine-readable instructions stored in memory 112 of the central plant controller 102 and executed by processor 110. In various other embodiments, the various "optimizers", "monitors", "applications", "controllers", "services", etc. described herein are provided by various circuits and/or circuit components as described in the preceding paragraphs. The building automation system 108 may also include various combinations of one or more circuits in various embodiments. It should be understood that many implementations of the various "optimizers", "monitors", "applications", "controllers", "services", "systems", etc. described herein are possible.

What is claimed is:

1. A central plant, comprising:
a plurality of subplants comprising a chiller configured to output supply water at a supply water temperature;
a sensor configured obtain a measurement of the supply water temperature; and
a control system configured to:
calculate an additional load factor based on the measurement of the supply water temperature and a supply water temperature setpoint;
obtain an actual load for the chiller;
calculate an effective load based on the additional load factor and the actual load;
generate load allocations for the plurality of subplants based on the effective load; and control the plurality of subplants to operate in accordance with the load allocations.

2. The central plant of claim 1, wherein the additional load factor is positive when the supply water temperature deviates from the supply water temperature setpoint.

3. The central plant of claim 1, wherein the control system is configured to calculate the additional load factor by:
setting additional load factor to zero in response to the measurement of the supply water temperature being greater than or equal to the supply water temperature setpoint; and wherein setting the additional load factor to a non-zero value when the measurement of the supply water temperature is less than a sum of the supply water temperature setpoint and an offset.

4. The central plant of claim 3, wherein, when the additional load factor is non-zero, the additional load factor comprises a scaling factor multiplied by a difference between the measurement of the supply water temperature and a sum of the supply water temperature setpoint and an offset.

5. The central plant of claim 1, wherein the control system is configured to generate load allocations based on the effective load by:
generating a predicted load for the central plant based on the effective load; and allocating the predicted load amongst the plurality of subplants.

6. The central plant of claim 1, wherein the additional load factor causes the control system to generate the load allocations for the plurality of subplants by increasing a load allocation for a first device of the plurality of subplants to compensate for a failure of the chiller to meet a load allocated to the chiller.

7. A method for controlling building equipment comprising a chiller, the method comprising:
operating the chiller to output supply water at a supply water temperature;
obtaining a measurement of the supply water temperature;
calculating an additional load factor based on the measurement of the supply water temperature and a supply water temperature setpoint;
obtaining an actual load for the chiller;
calculating an effective load based on the additional load factor and the actual load;
generating load allocations for the building equipment based on the effective load; and
controlling the building equipment in accordance with the load allocations.

8. The method of claim 7, wherein the additional load factor is positive when the supply water temperature deviates from the supply water temperature setpoint.

9. The method of claim 7, wherein calculating the additional load factor comprises setting the additional load factor to zero in response to the measurement of the supply water temperature being greater than or equal to the supply water temperature setpoint.

10. The method of claim 9, wherein calculating the additional load factor comprises, in response to the measurement of the supply water temperature being less than a sum of the supply water temperature setpoint and an offset:
calculating the sum of the supply water temperature setpoint and the offset;
determining a difference between the measurement of the supply water temperature and the sum; and
multiplying the difference by a scaling factor.

11. The method of claim 7, wherein generating load allocations comprises:
generating a predicted load for the building equipment based on the effective load; and
allocating the predicted load amongst the building equipment.

12. The method of claim 7, wherein generating load allocations for the building equipment based on the effective load comprises increasing a load allocated to a first device of the building equipment to compensate for a failure of the chiller to meet a load allocated to the chiller.

13. A method for controlling a central plant, comprising:
operating a first subplant of the central plant to output a first resource with a measureable characteristic;
obtaining a measurement of the measureable characteristic at an output of the first subplant and a setpoint for the measureable characteristic at the output of the first subplant;
calculating an additional load factor based on the measurement and the setpoint;
obtaining an actual load for the first subplant;
calculating an effective load for the first subplant based on a sum of the actual load and the additional load factor;
generating load allocations for the central plant based on the effective load; and
controlling the central plant based on the load allocations.

14. The method of claim 13, comprising controlling the first subplant with a control loop configured to drive the measureable characteristic towards the setpoint.

15. The method of claim 13, wherein the additional load factor is positive when the measurement deviates from the setpoint.

16. The method of claim 13, wherein calculating the additional load factor comprises setting the additional load factor to zero in response to the measurement being greater than or equal to the setpoint.

17. The method of claim 16, wherein calculating the additional load factor comprises, in response to the measurement being less than a sum of the setpoint and an offset,
calculating the sum of the supply water temperature setpoint and the offset;
determining a difference between the measurement and the sum; and
multiplying the difference by a scaling factor.

18. The method of claim 13, wherein generating load allocations comprises:
generating a predicted load for the central plant based on the effective load; and
allocating the predicted load amongst a plurality of subplants of the central plant, the plurality of subplants comprising the first subplant.

19. The method of claim 13, generating load allocations for the central plant based on the effective load comprises increasing a load allocated to a second subplant of the central plant to compensate for a failure of the first subplant to meet a load allocated to the first subplant.

20. The method of claim 13, wherein the first subplant comprises an electric centrifugal chiller.

* * * * *